United States Patent
Kundu (10) Patent No.: US 7,454,496 B2
(45) Date of Patent: Nov. 18, 2008

(54) METHOD FOR MONITORING DATA RESOURCES OF A DATA PROCESSING NETWORK

(75) Inventor: Ashish Kundu, Orissa (IN)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 10/732,736

(22) Filed: Dec. 10, 2003

(65) Prior Publication Data
US 2005/0132041 A1  Jun. 16, 2005

(51) Int. Cl.
*G06F 15/173* (2006.01)
(52) U.S. Cl. .................. 709/224; 709/225; 709/226; 709/228; 705/37; 370/230; 370/235
(58) Field of Classification Search .......... 709/224, 709/225, 226, 228; 705/37; 370/230, 235
See application file for complete search history.

(56) References Cited

U.S. PATENT DOCUMENTS

| | | | | |
|---|---|---|---|---|
| 6,041,307 | A * | 3/2000 | Ahuja et al. ................... 705/8 |
| 6,055,307 | A | 4/2000 | Behnke | |
| 6,154,778 | A * | 11/2000 | Koistinen et al. ........... 709/228 |
| 6,158,010 | A | 12/2000 | Moriconi et al. | |
| 6,625,643 | B1 * | 9/2003 | Colby et al. ................ 709/217 |
| 6,629,126 | B1 * | 9/2003 | Zinky et al. ................. 709/201 |
| 6,631,122 | B1 * | 10/2003 | Arunachalam et al. ...... 370/332 |
| 6,691,148 | B1 * | 2/2004 | Zinky et al. ................. 709/201 |
| 6,765,873 | B1 * | 7/2004 | Fichou et al. ............... 370/235 |
| 6,772,202 | B2 * | 8/2004 | Wright ....................... 709/219 |
| 6,772,211 | B2 * | 8/2004 | Lu et al. ..................... 709/226 |
| 6,857,020 | B1 * | 2/2005 | Chaar et al. ................. 709/226 |
| 6,965,930 | B1 * | 11/2005 | Arrowood et al. ........... 709/223 |
| 6,968,323 | B1 * | 11/2005 | Bansal et al. ................. 705/80 |

(Continued)

FOREIGN PATENT DOCUMENTS

JP  6175944  6/1994

(Continued)

OTHER PUBLICATIONS de Souza, R., et al. "Multi-Agent Enabled Modeling and Simulation Towards Collaborative Inventory Management In Supply Chains", Winter Simulation Conference 2000, pp. 1763-1771.

(Continued)

*Primary Examiner*—John Follansbee
*Assistant Examiner*—Backhean Tiv
(74) *Attorney, Agent, or Firm*—Gibb & Rahman, LLC (57) ABSTRACT

A method monitors data resources of a data processing network on behalf of a new consumer. The method comprises determining monitoring requirements of the new consumer. The monitoring requirements include: a list of data resources monitored for the new consumer; metrics of the monitoring data for the new consumer; a data format for monitoring data provided to the new consumer; a time interval between periods of sending the monitoring data to the new consumer; and actions taken during failure of the data resource. The method also includes comparing the monitoring requirements of the new consumer with monitoring capabilities of a plurality of monitoring entities to identify at least one monitoring entity, including monitoring capabilities matching the monitoring requirements of the new consumer.

13 Claims, 4 Drawing Sheets

U.S. PATENT DOCUMENTS

| | | | |
|---|---|---|---|
| 7,051,098 B2 * | 5/2006 | Masters et al. | 709/224 |
| 7,146,417 B1 * | 12/2006 | Coile et al. | 709/224 |
| 7,177,923 B2 * | 2/2007 | Hossain | 709/223 |
| 7,209,437 B1 * | 4/2007 | Hodgkinson et al. | 370/230 |
| 7,307,954 B1 * | 12/2007 | Strandberg et al. | 370/235 |
| 2002/0029185 A1 * | 3/2002 | Tanaka et al. | 705/37 |
| 2002/0040441 A1 | 4/2002 | See et al. | |
| 2002/0055990 A1 * | 5/2002 | Vaman et al. | 709/220 |
| 2002/0065922 A1 * | 5/2002 | Shastri | 709/227 |
| 2002/0091802 A1 * | 7/2002 | Paul et al. | 709/220 |
| 2002/0095400 A1 * | 7/2002 | Johnson et al. | 707/1 |
| 2002/0124074 A1 * | 9/2002 | Levy et al. | 709/224 |
| 2002/0194324 A1 * | 12/2002 | Guha | 709/223 |
| 2002/0194350 A1 * | 12/2002 | Lu et al. | 709/229 |
| 2003/0009580 A1 * | 1/2003 | Chen et al. | 709/231 |
| 2003/0023672 A1 * | 1/2003 | Vaysman | 709/203 |
| 2003/0117638 A1 * | 6/2003 | Ferlitsch | 358/1.13 |
| 2003/0123424 A1 * | 7/2003 | Jung | 370/338 |
| 2003/0126501 A1 * | 7/2003 | Musman | 714/26 |
| 2003/0167270 A1 * | 9/2003 | Werme et al. | 707/10 |
| 2004/0030777 A1 * | 2/2004 | Reedy et al. | 709/224 |
| 2004/0039820 A1 * | 2/2004 | Colby et al. | 709/226 |
| 2004/0117426 A1 * | 6/2004 | Rudkin et al. | 709/200 |
| 2005/0055322 A1 * | 3/2005 | Masters et al. | 707/1 |
| 2005/0080873 A1 * | 4/2005 | Joseph | 709/217 |

FOREIGN PATENT DOCUMENTS

| | | |
|---|---|---|
| JP | 10164063 | 6/1998 |

OTHER PUBLICATIONS

Zeng, L. et al. "An Agent-Based Approach for Supporting Cross-Enterprise Workflows", Proceedings of the 12$^{th}$ Australasian Conference on Database Technologies, Queensland Australia, 2001, pp. 123-130, IEEE Computer Society.

Jiang et al, "Providing Quality of Service Monitoring: Challenges and approaches", Proc. IEEE/IFIP NOMS'00, pp. 115-128, Hawaii, 2000.

Sahai et al, "Monitoring and Controlling Internet based E-services", The Second IEEE Workshop on Internet Applications (WIAPP'01), San Jose, CA, Jul. 2001.

Hilbert, D.M., and Redmiles, D.F,. "Agents for Collecting Application Usage Data over the Internet", In Proceedings of the Second International Conference on Autonomous Agents (Agents'98).

Al-Shaer et al, "HiFi: A New Monitoring Architecture for Distributed Systems Management", International Conference on Distributed Computing Systems, 1999.

Hauck and Reiser et al, "Monitoring Quality of Service Across Organizational Boundaries", Proceedings of the third International IFIP/GI Working Conference, USM 2000, Lecture Notes in Computer Science (LNCS), No. 1890, Munchen, Germany, Sep. 12-14, 2000, Springer.

Philip et al, "An Architecture for Network Resource Monitoring in a Distributed Environment", IPPS/SPDP Workshops 1998.

IBM Technical Disclosure Bulletin/Research Disclosure, 12, 2001, Article 159.

* cited by examiner

```
<Service Name="StockQuote">
        <MeasurementMode> Internal </ MeasurementMode
        <Metrics>
                <Metric Name="cpuUtilization">
                        <Measurement>
                                <granularity> per-request </granularity>
                                <Communication>Pull</Communication>
                                <Address> com.ibm.StockQuote.getCpu() </Address>
                        </Measurement>
                        <format>
                                <type>float</type>
                                <RelativeTo>100</RelativeTo>
                                <Duration unit="msec"> 10 </Duration>
                                <Decimal>2</Decimal>
                                <Delimiter>::</Delimeter>
                        </format>
                </Metric>
                <Metric Name="memory-usage">
                <Measurement>
                                <granularity> per-request </granularity>
                                <Communication>Push</Communication>
                                <Address>
                                        socket-based-on-configuration
                                </Address>
                        </Measurement>
                        <format>
                                <type>Bytes</type>
                                <Delimeter> :: </Delimeter>
                        </format>
                </Metric>
        </Metrics>
</Service>
```

METHOD FOR MONITORING DATA RESOURCES OF A DATA PROCESSING NETWORK

FIELD OF THE INVENTION

The present invention relates to systems, methods and computer programs for monitoring distributed resources.

BACKGROUND

A distributed data processing system typically includes a combination of hardware and software resources. The hardware resources may include a processor, a data storage unit, an input/output device, a network router, network link, etc. The software or 'logical' resources may include any computer program or program component, or a service provided by a hardware or software resource.

Monitoring of distributed systems is necessary for many purposes, including resource management, workload management (including load balancing and admission control), management of Quality of Service (QoS) and Service Level Agreements (SLAs), metering and accounting of system usage, fault detection and recovery and consistency management.

Monitoring of a distributed system typically comprises three steps: measurement of metrics and/or determination of the current state of a resource, collection of this data and reporting the collected data either as it is or in some processed manner to appropriate consumers. Based on measurement techniques, two different types of monitoring metrics can be differentiated: externally measurable metrics and internally measurable metrics. Certain types of parameters can be measured by measurement components external of the system, whereas resource-specific internal parameters can only be measured internally or in some cases also by the underlying computing layer such as an operating system.

Externally measurable parameters are generally used for determining the state of resources such as their availability, measuring performance such as throughput or response time, measuring usage of external resources such as network bandwidth, and for evaluation of QoS parameters. Internally measured parameters are used for determining resource utilization such as the number of threads used from a total number of available threads, identification of faults, and determination of resource usage at a given granularity level (per customer, request or process). The faults detected by internal measurement/monitoring may not be directly visible from the behaviour of the resource or system or from the values of external parameters. However, such faults may lead to reduced performance without a complete resource or system failure.

Factors such as granularity of measurement and the period between measurements are associated with each metric. The granularity of measurement may be per node, per container (containing one or more resource instances), per instance of the resource, per customer, or per request. The interval between periodic measurement of a parameter can be uniform along a time axis or non-uniform. The type of metric and factors such as granularity and period may determine where and how a metric should be measured—either by the resource internally, or by a separate computing layer or external measurement entity. Collection and reporting of monitoring data may be dependent on the granularity and period of measurement. Monitoring entities may process the collected data to generate monitoring data in the form required by the consumers.

There is a need for systems and methods that enable monitoring of both internal and externally measurable parameters. For example, there is a need for autonomic systems which can measure internal parameters for self-diagnosis and self-healing. In some cases self-healing or self-diagnosing may be impossible and so there is a need to support reporting of such parameters to external managers.

In some systems, internal parameters may be essential for metering and accounting of resource usage. Therefore, monitoring of such metrics is important for grid computing and autonomic computing, in addition to other computing paradigms that perform accounting functions based on resource-usage. Apart from metering and accounting, internal parameters are very useful in optimizing QoS objective functions, in resource management, in workload management, in studying system behaviours and correlating internal resource usage to the externally measurable parameter values. For example, in order to reduce the response time of a customer, the resource manager might have to increase the number of threads of the component. This is possible only if the manager knows about the internal load of the component in terms of thread usage.

Similarly, there is a need for measurement and reporting of internal parameters at the desired granularity level and desired period between measurements, in order to measure the resource usage of a component and to account for and bill the customer for the usage, to derive usage statistics, and to deliver such usage statistics to resource managers and SLA or QoS managers.

Many existing systems do not have sufficient flexibility to enable monitoring of service-dependent and internal metrics at granularities and periods according to the requirements of different consumers.

SUMMARY

The invention includes a method for monitoring data resources of a data processing network on behalf of new consumer. The method comprises determining monitoring requirements of the new consumer. The monitoring requirements include: a list of data resources monitored for the new consumer; metrics of the monitoring data for the new consumer; a data format for monitoring data provided to the new consumer; a time interval between periods of sending the monitoring data to the new consumer; and actions taken during failure of the data resource.

The invention also includes comparing the monitoring requirements of the new consumer with monitoring capabilities of a plurality of monitoring entities to identify at least one monitoring entity. including monitoring capabilities matching the monitoring requirements of the new consumer.

The monitoring entities monitor the data resources of the data processing network. The monitoring capabilities include one or more of: a current set of data resources being monitored by each of the plurality of monitoring entities; a set of data resources which each of the plurality of monitoring entities is capable of monitoring; monitoring metrics which each of the plurality of monitoring entities is currently monitoring; monitoring metrics which each of the plurality of monitoring entities is capable of currently monitoring; a current monitoring period; and data format capabilities of each of the plurality of monitoring entities. In response to identifying at least one monitoring entity of the plurality of monitoring entities the method includes monitoring capabilities matching the monitoring requirements of the new consumer, selecting at least one of the identified monitoring entities, and binds the new consumer to the selects at least one of the identified monitoring entities.

The binding of the new consumer to the selected at least one of the identified monitoring entities comprises establishing a connection between the new consumer and the selected at least one of the identified monitoring entities, sending a description of the new consumer's monitoring requirements to the selected at least one of the identified monitoring entities, and configuring the selected at least one of the monitoring entities to perform the new consumer's monitoring requirements. In response to a failure to identify at least one of the monitoring entities having monitoring capabilities the method matches all monitoring requirements of the new consumer, the method initiates a negotiation between the new consumer and a plurality of monitoring entities to select a best match, relative to other matches based on quality of service parameters, between the monitoring requirements of the new consumer and the monitoring capabilities of the plurality of monitoring entities.

BRIEF DESCRIPTION OF DRAWINGS

Embodiments of the present invention are described below in detail, by way of example, with reference to the accompanying drawings in which.

DETAILED DESCRIPTION OF EMBODIMENTS

Figure 1:
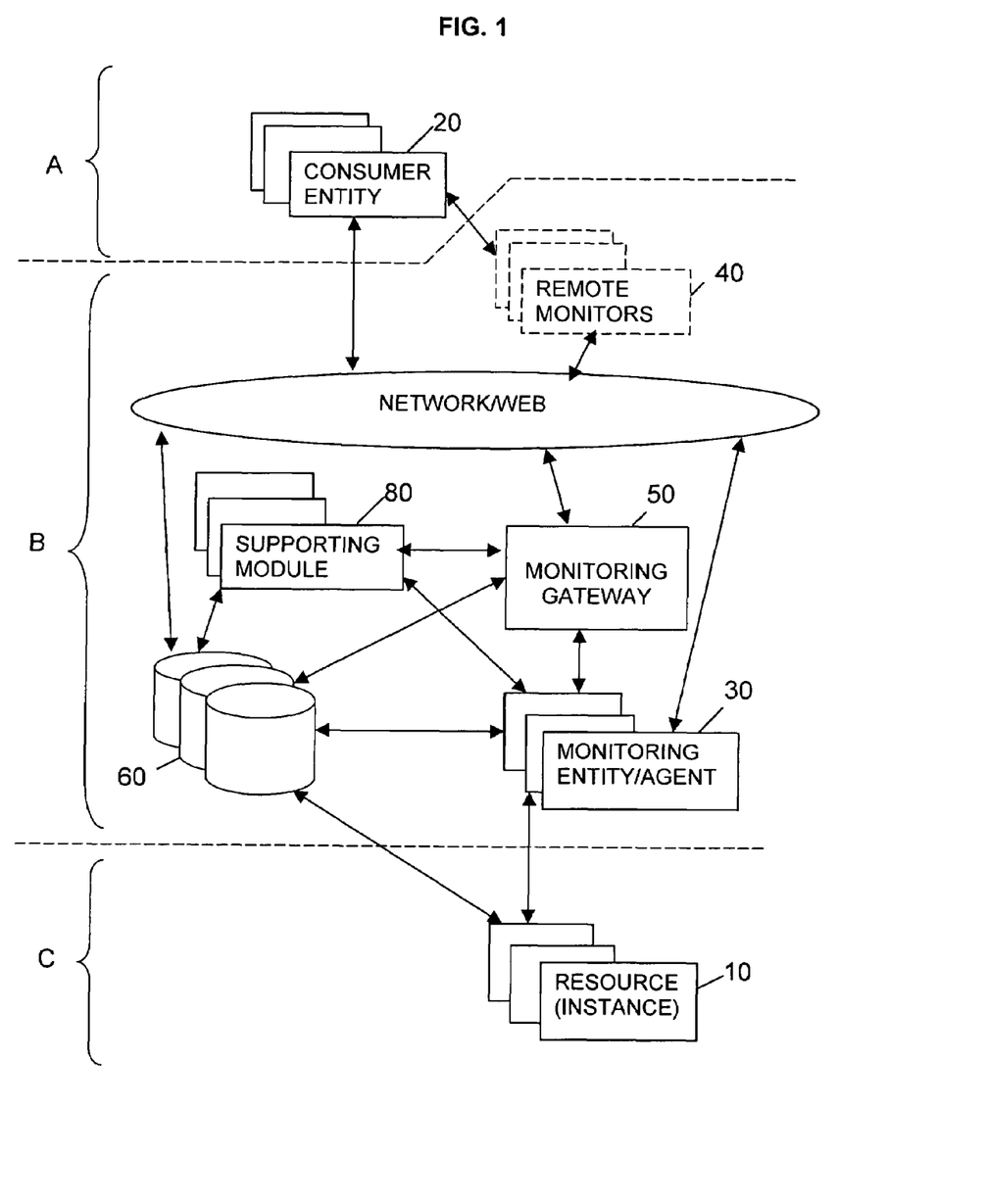
FIG. 1 is a schematic representation of a monitoring architecture according to an embodiment of the invention.

Described below with reference to FIG. 1 is an exemplary monitoring framework and method implementing the present invention. A number of resources 10, consumer entities 20 and monitoring entities 30 within a network publish a description of the data they produce, the data they receive and the data formats they support. In the case of a data consumer entity, the description comprises a set of monitoring requirements. In the case of a monitoring entity, the description comprises a set of capabilities and an identification of the subset of currently active capabilities (monitoring functions and their configuration attributes). The monitoring requirements and capabilities are compared by a monitoring gateway, or a negotiation between components, to select suitable monitoring entities to perform required monitoring functions on behalf of consumer entities A resource may be an instance of a computer program such as a Web service component, or an instance of a database. A hardware resource may be a network link, data storage or system memory. As described earlier, consumer entities may be running instances of computer programs or any logical or physical component which requires monitoring data. Monitoring entities and other components of the network are described in detail below.

Referring to FIG. 1, the monitoring framework can be represented by a layered model, in which a set of data producing resources 10 form a first resource layer A, a set of monitoring entities 30 and cooperating components 40, 50, 60, 80 form a second monitoring layer B and a set of final data consumers 20 form a third management layer C. The monitoring framework implemented as a monitoring layer B is distributed across a number of data processing systems within the network. Each of the data processing systems which includes a resource to be monitored typically also includes one or more components of the monitoring framework. Remote monitors 40 may also be provided elsewhere in the network.

The descriptions of outputs, requirements and capabilities are sent by each of the resources 10, consumer entities 20 and monitoring entities 30 to one or more monitoring gateways 50 which store the descriptions within repositories 60 within the monitoring layer. A number of support modules 80 may be provided to implement support functions that are generic to a number of monitoring entities.

It will be apparent to a person skilled in the art that individual steps of the methods described below can be performed under the control of computer program code and that a variety of programming languages and coding implementations may be used to implement the methods and components described herein. Such computer programs are not intended to be limited to the specific example control flows described below, and steps described as if performed sequentially may be performed in parallel (and vice versa). One or more of the operations described in the context of a computer-program-controlled implementation could alternatively be performed by a hardware electronics component.

Some portions of the following description refer to 'algorithms' for performing operations on data within a computer memory. An algorithm is conceived to be a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods, including components of a monitoring subsystem and a distributed monitoring framework. Apparatus for implementing the invention may be specially constructed for the required purposes, or may comprise one or more general purpose computers or other devices selectively activated or reconfigured by computer programs stored in the computers or devices. The algorithms and methods described below are not inherently related to any particular computer hardware or other hardware apparatus. Various general purpose machines may be used with programs in accordance with the teachings herein. Alternatively, the construction of more specialised apparatus to perform the required method steps may be appropriate.

In addition, the present specification discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

Figure 2:
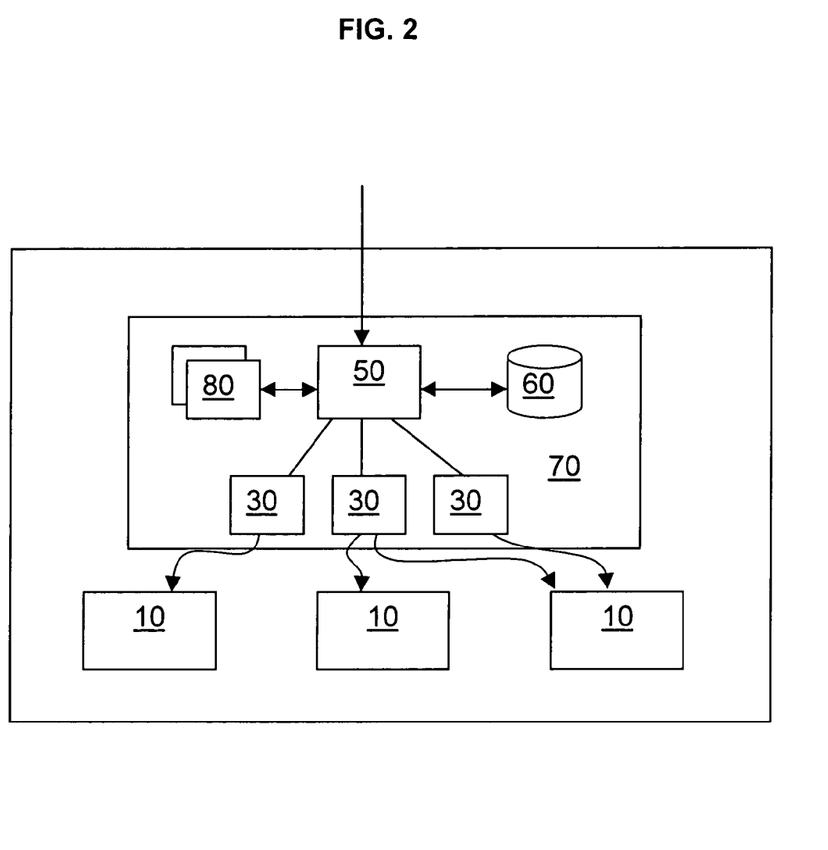
FIG. 2 is a schematic representation of a data processing system including a monitoring subsystem according to an embodiment of the invention.

FIG. 2 shows an example data processing system in which the present invention is implemented. The system includes a number of resource instances 10 which can be monitored, and a monitoring subsystem 70 including a number of monitoring entities 30. Communication between the various components is implemented using sockets, and is synchronous.

A monitoring gateway 50 within the monitoring subsystem 70 is responsible for authentication, registration and deregistration of consumers, as well as updating the repository 60. In particular, the gateway 50 stores published requirements and capabilities information in the repository, including a list of resources being monitored, the monitoring descriptions of the resources, and monitoring descriptions of consumer entities and monitoring entities. The monitoring descriptions of monitoring entities include an identification of resource instances being monitored, identification of the metrics being monitored and reported on, and the reporting data format. In response to a change in resource instances, monitoring entities or a consumer entity, the repository is updated.

There may be a plurality of repositories 60 storing different types of information within a single data processing system's monitoring subsystem 70, and there may be a plurality of repositories distributed across a plurality of monitoring systems of a distributed monitoring framework. In an embodiment providing remote access to the repositories, individual consumer entities or gateways running on one of the systems within the network can collaborate to provide access to data within the distributed set of repositories. This enables identification of remote monitoring entities as well as monitoring entities which are local to the resource to be monitored. References to 'a repository' hereafter are intended to include the possibility of multiple repositories.

In a first embodiment, the gateway 50 is responsible for matching the current monitoring requirements of consumer entities and the currently available monitoring data and/or monitoring capabilities of monitoring entities. In other embodiments, or when no perfect match is identified, the gateway serves as an intermediary enabling negotiation between consumer entities and monitoring entities based on Quality of Service (QoS) parameters of the consumer entities and monitoring entities to select monitoring entities that provide a best fit for the monitoring requirements of a consumer entity. The gateway 50 also handles binding of consumer entities to monitoring entities.

When a new consumer entity joins the monitoring system, the consumer entity registers with a gateway and is then bound to a set of one or more monitoring entities. The gateway receives the request from the consumer with its requirements document in XML. The binding steps are:

1. The gateway carries out matching, selection and/or negotiation.

2. The gateway then sends messages to each selected monitoring agent. The message contains the requirement document (or part of the information from the requirement document). The selected monitoring agents then configure themselves to start monitoring and sending monitoring data to the consumer entities.

3. Upon receiving confirmations from all selected monitoring agents, the gateway creates an XML binding document for the consumer entity. This binding document contains a list of resources being monitored, the monitoring entities and interconnections between them, and the data format which they use to monitor and report data.

4. The gateway then saves this binding document in the repository as part of a binding table. The key for accessing a binding document within the binding table is the consumer name.

Other systems within the network do not necessarily include all of the monitoring framework components shown in FIG. 2. For example, a system may include one or more monitoring entities 30 but access a monitoring gateway 50 and repository 60 running on a different system.

In alternative embodiments of the invention, the comparison of monitoring requirements, currently available monitoring data and capabilities, and the selection of monitoring entities 30 based on this comparison, is implemented within the monitoring entities 30 or within additional supporting modules 80, and the gateway 50 can rely on separate service provider components for authentication and other functions.

Figure 3:
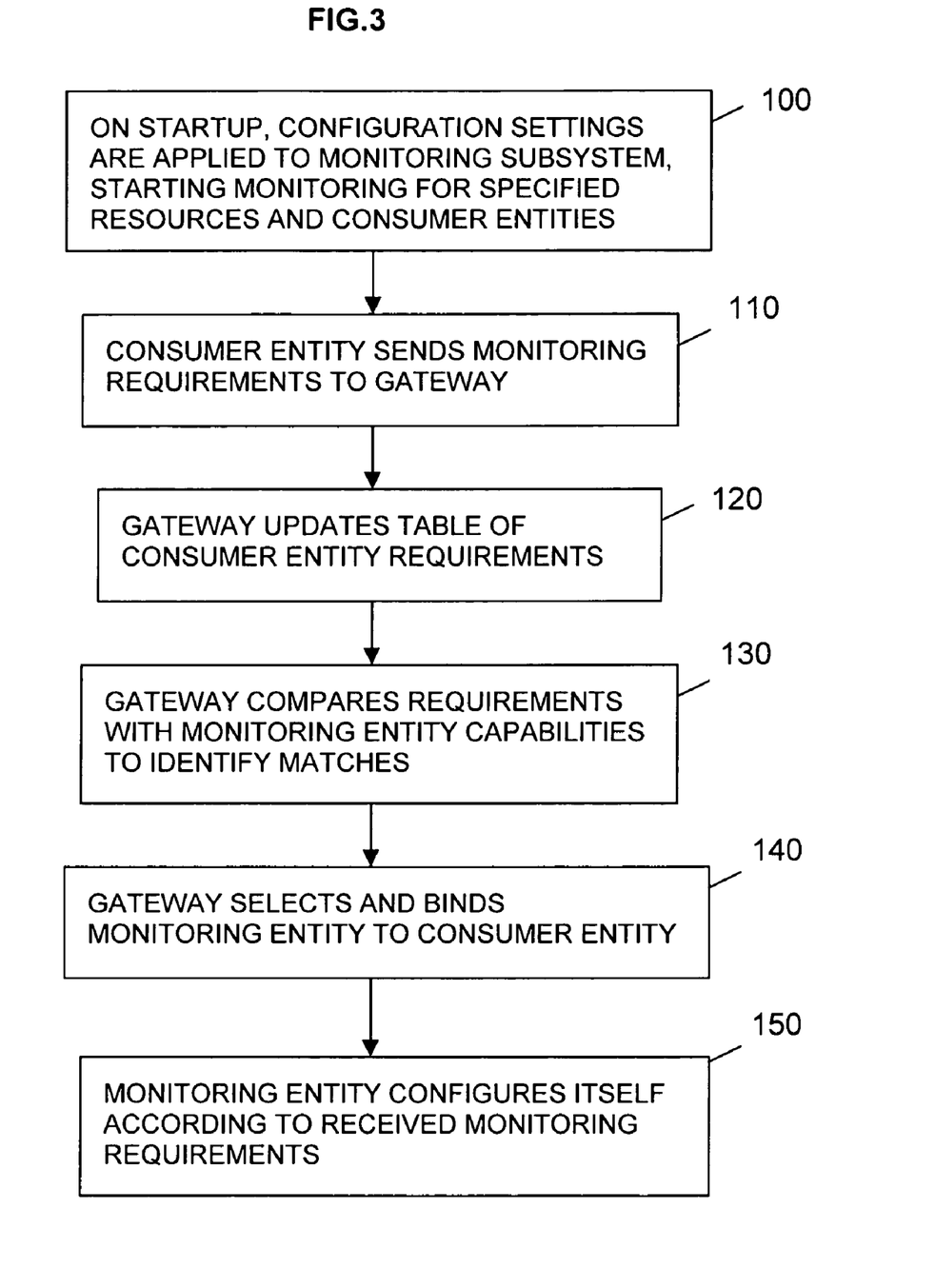
FIG. 3 is a flow diagram showing steps of a monitoring method according to an embodiment of the invention.

Monitoring steps according to a specific embodiment of the invention are described below with reference to FIG. 3.

In the present embodiment, start-up of the monitoring subsystem 70 initiates 100 monitoring of a number of resources based on current configuration settings of the monitoring subsystem. A set of monitoring entities 30 are initially bound to the resources 10 in accordance with the configuration settings, and these monitoring entities collect data from appropriate addresses within the system and report the data to any consumer entities 20 that have been registered as having a requirement for the data.

When a new consumer entity joins the monitoring system, the gateway 50 performs authentication of the consumer entity and the consumer entity publishes 110 its requirement description to the gateway 50. The gateway stores 120 the description in a repository 60.

As described above, the gateway 50 enables selection 130, 140 of monitoring entities 30 according to the specific, and possibly changing, monitoring requirements of consumer entities. In embodiments in which negotiation is implemented, the gateway initiates a process of negotiation 140 between the consumer entity 20 and the monitoring entities 30 and resources 10 within the monitoring and resource layers of the network. In embodiments in which negotiation is not implemented, the gateway 50 typically serves as a selector—using a comparison process 130 to match monitoring requirements, monitoring capabilities and active functions and QoS parameters of consumer entities.

The gateway, or a negotiation initiated by the gateway, identifies 140 the best set of monitoring entities to act as a set of sources of monitoring data for the consumer, and the gateway binds 140 the selected set of monitoring entities to the consumer entity. The monitoring entities may respond 150 to instructions from the gateway to configure itself to commence monitoring of new metrics if they are not currently being monitored and are required by a consumer entity. Upon successful binding between the monitoring entities and the consumer entity, the gateway publishes a binding document to the repository (as described above).

If the gateway determines that appropriate monitoring entities are not locally available or that the consumer entity requires services provided by a specific remote monitoring entity, the gateway may invoke a monitoring entity on another system in the network. For example, a remote monitor may be required to receive the monitoring data and adapt the data to a required format. The gateway (or in other embodiments the monitoring agents) handles selection of the bundling size, the frequency at which data is communicated to consumer entities, and determines the minimal computation model for the derived metrics.

If an existing consumer decides to de-register, the gateway unbinds the consumer's monitoring entities from the consumer entity to stop reporting of data by the monitoring entities, removes the binding document from the repository, and de-registers the consumer from the gateway. Additional actions may be taken at the monitoring subsystem level in response to this de-registration, including identifying those metrics output by a resource which are no longer required by any consumer entity. Monitoring of such metrics can then be stopped in order to improve resource utilization—reducing the total processing overhead associated with monitoring.

Each component in the monitoring framework has a description of its monitoring metrics and other details associated with producing and/or consuming a metric (such as the output format or required input format, methods by which the data can be collected, methods by which the data is reported, etc). A component that is both a producer and consumer possesses separable descriptions relating to its production and consumption of data.

The description of requirements published by a consumer entity may be used to coordinate processing by one or more monitoring entities, to receive monitored data from other entities in the monitoring and resource layers of the system and to process the received data to produce an output in the format expected by the consumer entity.

The following description provides further details of the above-described components of the monitoring framework of FIGS. 1 and 2, and methods of working the components for monitoring distributed resources.

Monitoring Gateway

The framework comprises a set of one or more monitoring gateways. Each gateway has access to the monitoring description of resources and monitoring entities, and the requirement descriptions of currently active consumer entities. A monitoring gateway may also use supporting modules for authentication, negotiation, matching of requirements to monitoring data availability, registration of consumers and de-registration. According to the present embodiment, all of these functions are either performed by the gateway or coordinated by the gateway.

To use the monitoring framework, a new consumer entity must register with the framework, by contacting one of the monitoring gateways. The contacted monitoring gateway handles authentication of a consumer entity (or instructs another component to do so). Known authentication algorithms can be used. Once the consumer entity is authenticated, the gateway starts a selection process on behalf of the consumer entity and monitoring entities. The monitoring gateway compares monitoring requirements of the consumer entity with capabilities of monitoring entities and selects a set of monitoring entities that are suitable to provide the required data. The monitoring gateway then forwards the consumer entity's requirements and a description of a dynamic negotiation protocol to the selected monitoring entities. The monitoring entities employ the described dynamic negotiation protocol to select monitoring attributes (such as metrics, granularity, period) to match the consumer entity's requirements. A specific implementation of negotiation is described in more detail below. The negotiation protocol describes whether the consumer entity's requirements are essential or negotiable. The protocol also describes whether the monitoring entity can respond to the gateway synchronously or asynchronously. The protocol also describes whether the response from the monitoring entity/agent provides the final result of negotiation in response to the requirements.

When a new consumer entity registers with the monitoring framework, the consumer entity sends a message with its preferences to the gateway or a supporting component that implements a negotiation algorithm. The component that implements the negotiation algorithm then determines whether the specified preferences can be supported. The preferences are represented in an XML format document. The preferences include the data format required, the resources to be monitored, the time interval between periodic sending of the data, and the actions to be taken during the system failure of a resource. The negotiation component then sends a message to the monitoring entities selected by the selection algorithm informing them of the actions to be taken when the monitoring data for a given resource instance is not available. The monitoring entities implement part of the negotiation algorithm. This part allows the monitoring entities to decide whether they can support the requested action and then (based on this decision) to inform the negotiation supporting component. If the monitoring entities cannot support the requested actions, the monitoring entities suggest another set of actions or action parameters. They carry out this assessment by applying a rule set to received action requests. This negotiation part of a monitoring entity is referred to hereafter as a rules processing engine.

The monitoring description of an entity is used to identify the type of data/metric it is monitoring and at what interval and in which format. A requirement description of a consumer identifies the required data, the required monitoring interval and the required data format. Also the requirement description specifies whether the required data is a derived data and, if so, provides an expression regarding how to compute the derived data from the existing data or metrics. The gateway takes all these descriptions and matches the data based on its type, description, the interval and the format. If there is a match, whether partial or full, the gateway can trigger a negotiation or can bind the monitoring entity to the consumer. The binding leads to a change in the repository data. Whenever a new monitoring entity or a new resource or a new consumer arrives, a binding document is created. Whenever there is change in any of the descriptions of consumer, monitoring entity or resource, the corresponding binding documents are updated.

As an example, let us assume that a monitoring entity is forwarding data to two customers, and that the data represents a response time per customer for a resource "r", with results bundled at a reporting frequency of 5 seconds. For a consumer entity "s", the required monitoring data is response time per customer for this resource but at a frequency of 15 seconds as one bundle. As part of negotiation, the monitoring entity may suggest to the consumer entity that the consumer entity accepts data bundles representing 5-seconds of monitoring and then combines these bundles to build a 15 second bundle of data. If such a negotiation is successful, the gateway may decide to send a remote monitor to the consumer entity's local node. This remote monitor would be responsible to collect these 5-second data bundles and then combine them into larger bundles. The monitoring gateway, upon successful negotiation, registers the consumer entity if the consumer entity is not registered already. The registration process includes creating connection bindings between the agent(s) and the consumer and updating the repository with this data.

Supporting Modules

Systems implementing the proposed framework may include components supporting authentication, negotiation, registration, de-registration, matching of monitoring data requirements, generating common sub-expressions for derived metrics across different consumers and/or monitoring agents. Additionally, installed components may enable finding of extraneous metrics being measured. Since there are well-developed algorithms in existence for performing all of these tasks, separate support modules can be used to encapsulate program code implementing the algorithms—avoiding the need to include such functions within in-line code of the gateways and monitoring entities. Such additional support modules may communicate with the monitoring gateway, repositories, monitoring layer and resource layer.

One supporting module is a Metric List Optimizer. This component receives any change in the metric lists for a resource type. If a resource supports more metrics (as per its monitoring description), but the required metrics are a subset of the currently active metric set, the Metric List Optimizer directs the corresponding monitoring entities (or the resource instances, if the instances are measuring some metrics) to stop measuring and monitoring those metrics.

However, if a new metric is to be monitored for a resource type, new monitoring entities are controlled to measure this metric. The monitoring entities are notified and instructed to commence monitoring.

A second supporting module is a Common Sub-Expression Finder (CSEF). The CSEF component implements algorithms for finding common bundles or sub-expressions that can be computed across multiple monitoring entities. The CSEF uses the repositories to determine the current monitoring topology (resource-monitoring-consumer) and to find the descriptions of each node. The CSEF module applies the algorithms to find the common computation part and the associated nodes, and returns these two values to the requestor.

A third supporting module is a Registration Module, that is used to carry out registration and de-registration of consumers, monitoring entities and resource instances. In case of a new registration, a dependency graph is built and stored in the repository. In the case of de-registration, the corresponding dependency graph/sub-graph is removed.

Repository

There are one or multiple repositories in the monitoring system. Some of the repositories are publicly accessible whereas other repositories are accessible only within the local system. The publicly accessible repositories handle descriptions of monitoring for one type of resource, requirement descriptions of consumers, etc. The internally accessible repositories handle data that is more frequently modifiable. They include documents describing bindings between consumers and monitoring agents and descriptions of monitoring entities. The latter include metrics, resource types and resource instances being monitored, the data format in which a monitoring entity is publishing data, and the format in which data is being sent to consumer entities. The repositories also store the topology of the monitoring framework at a given point of time (consumer-monitoring-resource layers).

Database systems and indexing techniques can be used to implement the repositories. Universal Description, Discovery and Integration (UDDI) is an example XML-based registry technology that can be used for implementing a public repository. UDDI is known for use to enable access to Web services.

One example repository is implemented as a relational database using IBM Corporation's DB2 database management software. DB2 is a registered trademark of International Business Machines Corporation in the US and/or other countries. Each resource has an entry in a table within the repository. The table entry includes the XML document describing the resource. Each monitoring entity and consumer also has such an entry, but in separate tables belonging to the group of monitoring entities and consumers respectively. There is also a graph structure that represents the interconnection between monitoring agents (or entities), consumers and resources. This graph can be modified dynamically. The graph is stored as a table in the repository.

As a new consumer or resource or monitoring entity joins the system, a corresponding row is created in the table. A column contains the list of consumers for a monitoring entity and for each resource. The table also contains a column for a list of monitoring entities monitoring a given resource. A row of the table for a consumer contains the corresponding monitoring entities from which the consumer will receive data.

Resource

The resource layer comprises resources (resource instances), which can be monitored for certain metrics, system behaviours and faults, etc. A resource can be a software resource or a hardware resource. Software resources include computer programs of any kind, logical constituents of programs such as data structures, threads, processes, procedures and objects. Hardware resources include a processing unit (CPU), data storage units providing system memory, disk storage or tape storage, and resources such as network connections.

Figure 4:
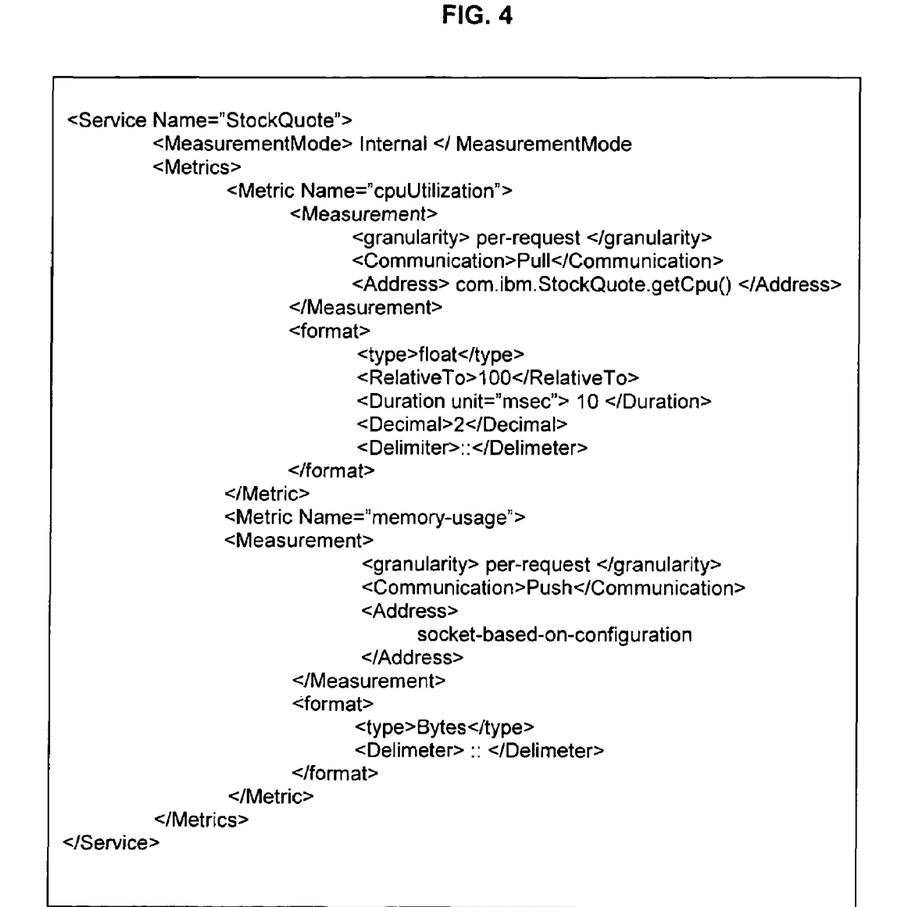
FIG. 4 is an example of an XML monitoring description for a service, according to an embodiment of the invention

Each resource has a description of the metrics which can be used to monitor the resource. An XML-based example of such a description is shown in FIG. 4. The description includes:

Metric being/to be measured;

Methods available to collect and report the metric values (such as push/pull mechanisms, and specific information regarding the push or pull address);

Granularity of metric measurement and reporting;

Period of metric measurement and reporting;

Data type or format (in which the monitored data can be made available for collection);

A mechanism or API for use to start, stop and control measurement and reporting activity, granularity, period, etc.

The description may also include other information.

A resource could measure some, all or none of the metrics and make the measured data available to the monitoring layer as specified in the description. The monitoring description of a resource is accessible publicly and is also dynamically modifiable.

If a new resource instance is deployed, the metric description of the resource instance is made accessible. A deployment manager or coordinator (implemented by the gateway in response to information from a resource manager) notifies the appropriate entities in the monitoring layer to start monitoring the instance and its underlying computing layer, if any. Management entities within the consumer layer are also notified about the new instance and the corresponding monitoring entities. The entities within the consumer layer then register with the new monitoring entities to receive data for some or all of the output metrics of the resource, in the resource's output format or a derived format.

Upon shut-down of a resource instance, a resource manager notifies the gateway which directs all corresponding monitoring entities not to monitor the data for this instance and notifies all management/consumer layer entities to stop receiving monitoring data for this instance. Some of the monitoring entities may also be shut down to cancel monitoring of data which is no longer required by any consumer. Dynamic responses to changes in the set of currently active resources and changes in requirements of consumer entities can avoid wasting system resources on monitoring activity which is no longer required.

During run-time of a resource instance, the resource instance can cancel measuring, reporting or supporting measurement of some previously supported metrics. Such a cancellation may be due to a fault in one of the components of a resource. The ability to respond to faults in this way is advantageous for autonomic computing. The resource instance can also add new metrics to be supported for measurement and reporting (which also has potential advantages for autonomic computing). Dynamic changes can also be made to the monitoring attributes for a particular metric (such as granularity of measurement, mode of monitoring data collection, etc). Such modifications or additions may be made during the runtime execution for a resource. Similarly an existing metric can be removed from being measured dynamically.

Following modifications to the monitoring description of a resource, communication among the appropriate entities in the three layers (resource layer, monitoring layer and consumer layer) is established in order to have consistent requirements descriptions for the consumer(s).

A metric that is added might be a newly-defined metric, or an existing defined metric that was not being measured or whose measurement was stopped and is now to be resumed. A new metric may be introduced or the granularity of an existing metric may be changed in response to a new consumer entity at the consumer layer. The mechanism used for collecting monitoring data may be changed dynamically by resources in case of a failure or changes in a resource. For example, data for an internal metric may be pulled instead of being pushed to the monitoring layer in response to a fault at the thread level.

The resource or the monitoring entity that initiates such a change dynamically notifies the gateway (and other monitoring layer entities) of the need to update the stored descriptions. The monitoring layer entities then notify appropriate consumer entities that are dependent on the metrics that have been changed, added or removed.

If a measurement mechanism of an existing metric is dynamically changed (such as from external measurement to internal measurement, or vice versa), the description of monitoring metrics is changed accordingly. This change of a measurement mechanism can occur for a specific instance of a resource.

Monitoring Entity/Agent

The monitoring layer also comprises components that measure metrics (although this is optional because measurement may be implemented by the resources), and components that collect data and report the monitoring data from monitoring entities or from other components of the monitoring layer. A monitoring entity can be implemented by a computer program, a hardware component or as 'firmware'. Each monitoring entity has its own data format for each metric for a resource.

An example monitoring entity is implemented as a computer program (for example, written in Java™, C or C++ programming language). The monitoring entity is capable of establishing network connections and communicating with other programs, resources and consumer entities. The connectivity function is implemented using sockets. The input to a monitoring entity is a monitoring description of each of the resource it is going to monitor. The monitoring description can be written in Extensible Markup Language (XML), implementing the World Wide Web Consortium's (W3C's) Document Object Model (DOM) standard. Upon receiving a new monitoring description, the entity creates a new thread to read the XML document and then starts monitoring the resource. The monitoring entity also creates another thread to take the monitored data for the resource, process the data, and send the processed data to the associated consumers in the required format.

Each monitoring entity is a producer and a consumer of data and has access to all the monitoring descriptions of the resources it monitors at any point of time. It also has a list of metrics it monitors for each resource. It has the description of requirements (list of metrics and associated monitoring attributes per resource) from each of its consumers.

Each monitoring entity publishes its descriptions by sending them to the repositories. It also knows of its consumer and resource instance bindings. Upon receiving a change in monitoring description of a resource instance, the monitoring entity starts monitoring new metrics or starts monitoring metrics using new parameters (granularities, periods, addresses, etc), or stops monitoring metrics removed from the resources description. Upon receiving a change in the requirements description of a consumer, the monitoring entity or gateway decides what metrics are to be monitored and what metrics need not be monitored. The Metric List Optimizer component is notified of a new metric being required or an existing metric not being required. If there is no such component in the system, the monitoring entity can implement this function.

If a monitoring entity receives a directive from a consumer or gateway to monitor a derived metric, then the monitoring entity (by itself or with the help of a Common Sub-Expression Finder (CSEF) component) decides how to compute the derived metric. As an outcome, if the monitoring entity has to receive some metrics from another set of monitoring agents, then the current monitoring agent requests the registration module to register the current monitoring agent as a consumer of required data output by the other monitoring agents.

The monitoring entities also implement bundling algorithms. Bundling technique is used to create a maximal bundle of data that can be sent to consumer(s) such that resource consumption in transmitting monitoring data to consumers is reduced. Below we have discussed some possible algorithms. However, it might be possible that there are multiple agents that need to generate same bundles of same data. There might be agents that are generating bundles of data (for 5 seconds) and another agent has to create bigger bundles (for 20 seconds). The second kind of agents would register themselves at the Registration Module as a consumer of these bundles at the agent(s). However, in order to find out if such common computations can be carried out at minimum number of places, the monitoring entities can request the CSEF to find out this.

If a derived-metric is not going to be required, then the monitoring agent(s) stop computing that derived metric. If this means that they need not remain as consumers to some of the monitoring entities, then they would request the Registration Module to de-register themselves from the consumer list of other agents.

Each monitoring entity is capable of processing the monitoring data according to the data processing instructions of a consumer. For efficient data processing, the entity can perform common processing (such as common sub-expression in compilers) across all consumers and then do consumer specific processing on top of it.

A monitoring entity implements the following algorithms:

Algorithm-1

1. For each metric, receive data for a predefined period for each consumer.
2. For metric "M", if derived data is required by a consumer, then compute the derived data for the predefined period (for a current cycle or previous cycles).
3. Repeat 2 for each metric.
4. Repeat 2 and 3 for each consumer.
5. Send the data to the respective consumer entity at the end of the monitoring period.

Algorithm-2

1. For each metric of a resource being monitored, find out how many consumers require derived data.
2. For all consumers, for a given metric such that the granularity of requirement is same, find the expression associated with the computation of the derived data.
3. Apply a technique to find common sub-expressions among such expressions of a metric for the last or earlier periods.
4. Compute such common sub-expressions once and use them to compute final expressions for the metric for the last or earlier cycles.
5. Repeat 2-4 for each metric.
6. Send the data at the end of the cycle.

Each monitoring entity is capable of bundling the data according to the cycle(s) of one or more of the consumers, and sending the bundled data to the consumers. This can reduce bandwidth requirements. Experimental analysis has shown that bundling of monitoring data for reporting to consumer entities significantly improves the throughput of the system. For example, if each consumer entity in the management layer (that is, each ultimate consumer) has one or more dedicated monitoring entities, then the monitoring data can be bundled and reported according to a different reporting period than the monitoring period specified by the original data producer(s). The monitoring entities can aggregate the data for the particular reporting period desired by the consumer.

A monitoring entity also implements the following algorithms:

Algorithm-3

1. For each metric of each resource repeat the following:
2. For all consumers, for a given metric such that the granularity of requirement is same, find the cycles over which the data is required.
3. Find out the minimum cycle among them.
4. Make bundles of this minimum cycle and send data to all such consumers for this metric.

Algorithm-4

1. For each metric of each resource repeat the following:
2. For all consumers, for a given metric such that the granularity of requirement is same, find the cycles over which the data is required.
3. Find out the cycle "C" that occurs maximum number of times among them. ('mean' instead of 'mode' can be used).
4. Make bundles of this cycle "C" and send data to all such consumers for this metric.

A monitoring entity supports encryption techniques for sending data over network to a remote monitor or a consumer. Existing encryption techniques can be used for this purpose.

A monitoring entity can be a composite agent that produces composite monitoring metric out of the metrics of some resources. This agent is also described in the repositories such that it can be matched for during the matching and selection process for a consumer. The composite agent receives the monitoring data of various resources from resource instances and/or other monitoring entities. Then it uses them to compute data for the composite metric. The agent can use CSEF module to detect common computations that it can share with other entities and how to use common computations. Upon getting result from CSEF, it can register through registration module for the dependant monitoring entities.

If a new monitoring description for an existing resource or a new resource instance is available at any given point of time, the monitoring entity starts monitoring according to the new description. If a consumer registers with a monitoring entity with its description of requirements, then the monitoring entity starts reporting data to the consumer according to the requirements description.

For monitoring data of high priority pushed from the measurement entity, the monitoring entities forward such data as soon as possible to the appropriate consumer(s).

If a consumer modifies its description of requirements on monitoring data, the modified description is partially or completely available with the monitoring entities. If an existing monitoring metric is not required by any of the consumers, then the monitoring entity directs the corresponding measurement entity and/or the resource to stop its measurement and reporting. This action on the part of resource may get reflected in its monitoring description; if an existing metric is removed dynamically from being measured, it also gets removed dynamically from the monitoring description of the resource. Such a modification initiates a chain of actions later.

Consumer Entity

The management or consumer layer consists of components that use the monitoring data to carry out management and scheduling tasks, such as monitoring of composite services, metering and accounting, system behaviour analysis, SLA and QoS management, and logging. A management entity can be a software program or a hardware component or firmware.

Each entity (a consumer) in this layer has a description of the requirements (as described in the monitoring layer section). The requirement description of a consumer would specify the resource types, the metrics (both primitive and derived), granularities, period, cycle of data collection (bundling size) etc. The description might include Resource name/identifier
Metrics to be reported
Granularity of each of the metrics
Period (if synchronous) of each of the metrics
Cycle per metric for which the data to be collected and then reported
Data processing instructions: average monitoring data over some period of time.
For derived metrics, corresponding expression based on primitive or other-well-defined derived metrics has to be defined as part of this description.
Mechanism in which data to be reported to the consumer, if it is different from the mechanism(s) employed by the producer.

The cycle per metric could be based on time or on number of requests, etc. For example, report monitoring data for resource R1, metric 'CpuUtilization' per customer with a period of 1 millisecond for last 5 seconds or last 100 requests.

Upon registering for receipt of monitoring data from the monitoring layer, the consumer passes the set of requirements to the appropriate entities in that layer. If required, the consumer in the management layer can modify the set of requirements dynamically. Such a modification gets propagated in the same or a different form to all the layers down to the resource layer or to the measurement entities.

If a new resource is introduced or an existing resource is removed, then the consumer entities access the monitoring description of this resource and pass their requirement description with respect to this resource across to the monitoring layer. This is essentially a modification of the requirement description of the consumer.

If there are modifications to the monitoring description of a resource, then communication among the appropriate entities in the three layers is established in order to have consistent requirements descriptions for the consumer(s).

Remote Monitor

In case, the supporting modules and other components in the monitoring system find that it will be costlier in terms of throughput and resource utilization to compute additional derived data (as compared with before the changes to the requirements for consumer "s"), then a monitoring entity may be sent to the local system or network of the consumer. This monitoring entity takes the requirement description of associated consumer(s) as input, and receives data from other monitoring entities (as prescribed by the supporting modules). Based on the received information, the monitoring entity computes required data from the incoming data and data bundles in a format required by the consumer. Thus, there may be a distributed network of cooperating monitoring entities.

If the requirement description for the consumers is based on a standard language, then a remote monitor can be an engine for that language. In order to process the requirement description of a consumer, the gateway or the supporting modules (or another complementary component) must be able to read and understand the format/language in which the document is written. One embodiment provides a subcomponent that implements the reading and parsing mechanism for particular document formats. If the language is a standard one, then the monitoring subsystem can use a generic subcomponent that can parse and read documents written in this language. For example if the language is based on Extensible markup language (XML), then Distributed Object Model (DOM) processing tools can be used.

Implementation of Components

The monitoring entities and external measuring entities can be implemented as software programs/agents. Each of a set of measuring entities external of a resource can be collected together on the same physical machine containing the resource(s). Each monitoring agent could be on a different machine.

The monitoring agents, measurement entities and resources may communicate through a publish/subscribe system and also through normal network communication mechanisms. The monitoring description of a resource can be specified using an XML schema (as shown in FIG. 4) and similarly for requirement specifications. The descriptions would be available in a public repository. As soon as a description is modified, the modifying agent, consumer entity or resource notifies other agents through the publish/subscribe system. This information is also updated in the repository, unless it is a temporary state.

Upon introduction of a new resource, the resource manager activates the measurement entities on that node and registers that instance(s) for being monitored at specific agent(s). Interested consumers of management layer register themselves with agents with their requirement descriptions. The agent(s) in turn retrieve the monitoring description and configuration of the resource instance/measurement entities and build a memory model of it for collecting monitoring data. The agents would subscribe to topics to which measurement entities, resources and other agents publish metric values and resource states. They would also use socket connections and RPC to pull monitoring data from components in both monitoring and resource layer. The management layer would be listening to topics in the publish/subscribe system. An agent can also connect to a consumer through TCP connection for control messages or immediate status reports.

For computation of derived data, the agent would implement one of the algorithms mentioned earlier or any other algorithms. For bundling of data, the agent can use any of the algorithms specified earlier or any other suitable algorithm. Supporting modules could implement a software version of the existing algorithms for authentication, matching, negotiation, registration. For negotiation, the monitoring agents also implement the negotiation protocol(s).

Web Services Monitoring Architecture Implementation

Each monitoring agent (MA) is local to a data processing unit or node within the network. The MA is responsible for collection of monitoring data and communication of monitoring data to monitoring services. An agent collects data for each service instance deployed on its local node. It also collects monitoring data about the 'health' of a node. The health of a node denotes the load generated by all processes running on that system at a given point of time, the resource usage of the node (memory usage, cpu load, etc), and the load of each container (underlying computing software layers or middleware), if any, on that node. Each raw data received/pulled by the agent for a service is parsed according to the format specified in the monitoring specification of that service. This raw data is bundled per service over granularity and an interval as specified by a monitoring service, and then communicated to appropriate monitoring services. Monitoring agents are capable of sending out notifications (fault-related, behavioural, etc) to appropriate monitoring services. Each agent knows the addresses of monitoring services associated with it. A monitoring agent supports interfaces enabling pulling of data. Monitoring agents also support interfaces for modification of granularity/interval of data bundles, by monitoring services.

A monitoring service can be implemented for each Web service, a monitoring service for each node, and another monitoring service for all containers on all nodes. A monitoring service is responsible for providing monitored data to the consumers, SLA measurement service, metering/accounting service, resource manager, etc. Each consumer entity is likely to have a different granularity and interval at which the consumer entity expects monitoring data for a specific service 'S'. The consumer entity has the responsibility to specify this information (statically or dynamically) to the monitoring service for web service 'S'. Each monitoring service (MS) maintains a list of agents that are monitoring the associated service instances.

The MS directs the monitoring agents in its list to bundle and send the monitoring data at a granularity g and interval I. Values of "g" and "I" are such that the monitoring service can derive the granularities and intervals required by consumers from g and I. During its runtime, a monitoring service bundles the monitoring data (from agents) and communicates each of the bundles to the appropriate consumer at appropriate point of time (based on the interval).

Each MS supports interfaces for pull of data by consumers. A data pull by a consumer is propagated to the agent(s), if monitoring data does not possess the data with it or else it is served by the monitoring service itself. For a service-specific notification from an agent, a monitoring service immediately notifies the resource and workload managers. A consumer notifies associated monitoring service(s) for any change in granularity g and interval I; monitoring service(s) in turn, notify associated monitoring agents about the change. A service-specific monitoring service is responsible for data of one service, node monitoring service is responsible for data of all nodes and container monitoring service is responsible for data of all containers on all nodes.

Whenever a new service instance is deployed, resource manager notifies the monitoring service about the address of the monitoring agent on that node. If the service is new, prior to the notification, resource manager deploys a new monitoring service. If the node is new, resource manager notifies the node manager about its address. If there is a new container deployed on the node, it notifies the container monitoring service. Each monitoring service that gets notified, directs the monitoring agent to monitor the service instance and/or node and/or container and send the data bundled over a granularity g and interval I. Similarly when a service instance is to be terminated, a resource manager notifies the monitoring service to stop monitoring the instance. Monitoring service in turn directs the agent associated to stop monitoring the instance. Upon receiving the directive to monitor an instance, a monitoring agent imports the monitoring specification of the service, instantiates the monitoring links, if not available already, as per the specification and directive parameters provided by resource manager through monitoring service and then starts monitoring.

Upon dynamic modification of monitoring description of a web service, the corresponding monitoring service is notified along with the agents and the monitors. This is just a publish in the pub/sub system being used on a topic. The message contains the service name and the new monitoring description. The monitor then checks if its requirement description R is a subset of the new monitoring description S. If not, then it removes the entries specific to R-S and also tunes the granularity and period of monitoring towards the higher granularity (opposite of fine granularity).

In addition, systems according to one embodiment of the invention enable dynamic registration of new consumers for monitoring data, or de-registration of old consumers to stop them receiving monitoring data. Existing consumers may be able to dynamically modify their requirements of monitoring data. For example, a new SLA may be added due to dynamic SLA negotiation, which could lead the SLA to receive data for some new metrics or to receive data at a different granularity level. Additionally, some faults may prevent a sub-component of a resource from being able to measure and/or report the data to a consumer. If this state continues for a long period of time, then the consumers that are waiting for the data need to be informed of the non-availability of such data. In this case, there is dynamic change in the monitoring metrics being measured/monitored on a per-resource-instance basis. Similarly the requirements of a consumer might change dynamically based on the dynamic states of resources or external requirements.

Dynamic registration of consumers for monitoring data raises another issue: the need for matching of the requirements of the consumer with the available monitoring data from each agent, selection of a suitable monitoring agent(s) and binding the new consumer with the agent(s). Dynamic changes in the metrics being monitored or the granularity or period at which the metrics are being monitored for a resource adds another dimension, since such a change may lead to the changes in the requirements of the consumer or the bindings to the monitoring agents.

Given that there could be multiple consumers for the monitoring data from a resource with differences in the granularity, monitoring period or reporting frequency, or at the level of derived parameters out of primitive metrics, there is also a need for optimized computation of the data as desired by multiple consumers and optimized transmission frequency of the data to consumers. Such optimization can improve resource utilization.

There has been a lot of work in monitoring of resources, but existing solutions typically do not consider dynamic changes to the metrics being monitored, to the requirements of consumers, nor to the set of consumers that are interested in the monitoring data. Existing solutions typically assume that the metrics that are being monitored are mostly externally measurable metrics. Resource-dependent metrics have rarely been taken into consideration in building monitoring frameworks and systems. Furthermore, existing solutions do not provide dynamic and automatic matching and selection of monitoring agents for a consumer or a set of consumers.

At least some of the problems described above have only arisen recently, because of the advent of resource usage based metering and accounting (which requires monitoring of internal metrics), autonomic computing and automatic SLA negotiations (for which metrics needed by various consumers may change over time, including at runtime).

Additionally, resource wastage due to monitoring of unnecessary metrics has to be controlled.

The present invention mitigates one or more of the problems or limitations of known systems, and in one embodiment provides a monitoring framework that facilitates monitoring of both external and internal metrics for a system or network comprising heterogeneous resources. The framework supports static and dynamic registration and de-registration of resources and consumers of the monitoring data. The framework also supports dynamic changes to the monitoring description of a resource and of a resource instance, enabling consumers to dynamically modify their requirements description. The framework makes it possible to improve upon resource utilization, computation and communication of monitoring data while supporting multiple consumers for their desired metrics at the desired granularity and desired monitoring periods.

Various alterations and modifications to the techniques and arrangements described in detail above can be made within the scope of the present invention, as will be apparent to a person skilled in the relevant art.

What is claimed is:

1. A method for monitoring data resources of a data processing network on behalf of new consumer of monitoring data to the data processing network, said method comprising:
   determining monitoring requirements of said new consumer, wherein said monitoring requirements include;
   a list of data resources monitored for said new consumer;
   metrics of said monitoring data for said new consumer;
   a data format for monitoring data provided to said new consumer;
   a time interval between periods of sending said monitoring data to said new consumer; and
   actions taken during failure of said data resource;

comparing the monitoring requirements of the new consumer with monitoring capabilities of a plurality of monitoring entities to identify at least one monitoring entity including monitoring capabilities matching the monitoring requirements of the new consumer, wherein; said monitoring entities monitor said data resources of said data processing network; and said monitoring capabilities including one or more of:
- a current set of data resources being monitored by each of said plurality of monitoring entities;
- a set of data resources which each of said plurality of monitoring entities is capable of monitoring;
- monitoring metrics which each of said plurality of monitoring entities is currently monitoring;
- monitoring metrics which each of said plurality of monitoring entities is capable of currently monitoring;
- a current monitoring period; and
- data format capabilities of each of said plurality of monitoring entities; and in response to identifying at least one monitoring entity of said plurality of monitoring entities including monitoring capabilities matching the monitoring requirements of the new consumer, selecting at least one of the identified monitoring entities and binding the new consumer to the selected at least one of the identified monitoring entities, wherein binding said new consumer to said selected at least one of the identified monitoring entities comprises establishing a connection between said new consumer and said selected at least one of the identified monitoring entities, sending a description of the new consumer's monitoring requirements to said selected at least one of the identified monitoring entities, and configuring said selected at least one of the monitoring entities to perform said new consumer's monitoring requirements; and in response to a failure to identify at least one of the monitoring entities having monitoring capabilities matching all monitoring requirements of the new consumer, initiating a negotiation between the new consumer and a plurality of monitoring entities to select a best match, relative to other matches based on quality of service parameters, between the monitoring requirements of the new consumer and the monitoring capabilities of the plurality of monitoring entities.

2. The method according to claim 1, wherein the comparing requirements with capabilities comprises comparing a required monitoring granularity with monitoring granularity capabilities of each of the plurality of monitoring entities.

3. The method according to claim 1, further comprising:
the new consumer sending a description of its monitoring requirements to a repository;
the plurality of monitoring entities sending descriptions of their respective monitoring capabilities to the repository; and
storing the descriptions of requirements and capabilities in the repository;
wherein the comparing comprises comparing the descriptions of requirements and capabilities stored in the repository.

4. The method according to claim 3, further comprising creating a binding document describing the monitoring performed for the new consumer by the selected at least one of the monitoring entities, and sending the binding document to the repository.

5. The method according to claim 3, wherein the descriptions of monitoring entities' capabilities comprise a list of the metrics currently being monitored for each of said list of monitored data resources.

6. The method according to claim 5, wherein the descriptions of said monitoring entities' capabilities comprise currently active monitoring parameters for each monitoring metric.

7. The method according to claim 5, wherein the descriptions of said monitoring entities' capabilities comprise the data format for each monitoring metric.

8. The method according to claim 1, further comprising:
using a common sub-expression finder module to identify a monitoring entity having at least one sub-expression in common with the new consumer, and selecting the monitoring entity having the at least one common sub-expression.

9. A data processing system for monitoring resources of a data processing network, comprising:
a data storage unit for storing;
monitoring requirements of a new consumer, said monitoring requirements including;
- a list of data resources monitored for said new consumer;
- metrics of said monitoring data for said new consumer;
- a data format for monitoring data provided to said new consumer;
- a time interval between periods of sending said monitoring data to said new consumer; and
- actions taken during failure of said data resource; and
monitoring capabilities of each of a plurality of monitoring entities, including at least one monitoring entity matching the monitoring requirements of the new consumer, said monitoring capabilities including one or more of:
- a current set of data resources being monitored by each of said plurality of monitoring entities;
- a set of data resources which each of said plurality of monitoring entities is capable of monitoring;
- monitoring metrics which each of said plurality of monitoring entities is currently monitoring;
- monitoring metrics which each of said plurality of monitoring entities is capable of currently monitoring;
- a current monitoring period; and
- data format capabilities of each of said plurality of monitoring entities; and a monitoring manager, responsive to monitoring requirements of said new consumer, for comparing the monitoring requirements of the new consumer with monitoring capabilities of said plurality of monitoring entities stored in the data storage unit to identify at least one monitoring entity including monitoring capabilities matching the monitoring requirements of the new consumer, wherein said monitoring entities monitor said data resources of said data processing network; and in response to identifying at least one monitoring entity of said plurality of monitoring entities including monitoring capabilities matching the monitoring requirements of the new consumer, selecting at least one of the identified monitoring entities and binding the new consumer to the selected at least one of the identified monitoring entities, wherein binding said new consumer to said selected at least one of the identified monitoring entities comprises establishing a connection between said new consumer and said selected at least one of the identified monitoring entities, sending a description of the new consumer's monitoring requirements to said selected at least one of the identified monitoring entities, and configuring said selected at least one of the monitoring entities to perform said new consumer's monitoring requirements; and in response to a failure to identify at least one of the monitoring entities having monitoring capabilities matching all monitoring requirements of the new consumer, initiating a negotiation between the new consumer and a plurality of monitoring entities to select a best match, relative to other matches based on quality of service parameters, between the monitoring requirements of the new consumer and the monitoring capabilities of the plurality of monitoring entities.

10. The data processing system according to claim 9, wherein the monitoring manager comprises:
a component for handling registration and de-registration of new and existing consumers, respectively;
a selector for selecting at least one monitoring entity of said plurality of monitoring entities for said new consumer; and
a connection manager for establishing a connection between the new consumer and the selected at least one monitoring entity.

11. The data processing system according to claim 9, wherein the monitoring manager further comprises a resource optimizer for determining at least one of said plurality of monitoring entities capable of generating said monitoring metrics from data measured for a data resource, according to said monitoring requirements.

12. A distributed data processing system comprising:
a set of data processing apparatuses each comprising at least one resource;
a set of data processing apparatuses each comprising at least one new consumer requiring monitoring data for a resource;
at least one data storage unit for storing a repository of monitoring requirements of the new consumer and existing consumers, and for storing monitoring capabilities of each of a plurality of monitoring entities, said monitoring requirements of the new consumer including:
a list of data resources monitored for said new consumer;
metrics of said monitoring data for said new consumer;
a data format for monitoring data provided to said new consumer;
a time interval between periods of send mg said monitoring data to said new consumer; and
actions taken during failure of said data resource; and
said monitoring capabilities of each of a plurality of monitoring entities, including at least one monitoring entity matching the monitoring requirements of the new consumer, said monitoring capabilities including one or more of:
a current set of data resources being monitored by each of said plurality of monitoring entities;
a set of data resources which each of said plurality of monitoring entities is capable of monitoring;
monitoring metrics which each of said plurality of monitoring entities is currently monitoring;
monitoring metrics which each of said plurality of monitoring entities is capable of currently monitoring;
a current monitoring period; and
data format capabilities of each of said plurality of monitoring entities; and a monitoring manager, responsive to the monitoring requirements of said new consumer, for comparing the monitoring requirements of the new consumer with monitoring capabilities of said plurality of monitoring entities stored in the data storage unit to identify at least one monitoring entity including monitoring capabilities matching the monitoring requirements of the new consumer, wherein said monitoring entities monitor said data resources of said data processing network; and in response to identifying at least one monitoring entity of said plurality of monitoring entities including monitoring capabilities matching the monitoring requirements of the new consumer, selecting at least one of the identified monitoring entities and binding the new consumer to the selected at least one of the identified monitoring entities,
wherein binding said new consumer to said selected at least one of the identified monitoring entities comprises establishing a connection between said new consumer and said selected at least one of the identified monitoring entities, sending a description of the new consumer's monitoring requirements to said selected at least one of the identified monitoring entities, and configuring said selected at least one of the monitoring entities to perform said new consumer's monitoring; and in response to a failure to identify at least one of the monitoring entities having monitoring capabilities matching all monitoring requirements of the new consumer, initiating a negotiation between the new consumer and a plurality of monitoring entities to select a best match, relative to other matches based on quality of service parameters, between the monitoring requirements of the new consumer and the monitoring capabilities of the plurality of monitoring entities.

13. A computer storage device tangibly storing instructions executable by a computer to perform a method for monitoring data resources of a data processing network on behalf of new consumer of monitoring data to the data processing network, said method comprising;
determining monitoring requirements of said new consumer, wherein said monitoring requirements include;
a list of data resources monitored for said new consumer;
metrics of said monitoring data for said new consumer;
a data format for monitoring data provided to said new consumer;
a time interval between periods of sending said monitoring data to said new consumer; and
actions taken during failure of said data resource;
comparing the monitoring requirements of the new consumer with monitoring capabilities of a plurality of monitoring entities to identify at least one monitoring entity including monitoring capabilities matching the monitoring requirements of the new consumer, wherein;
said monitoring entities monitor said data resources of said data processing network; and
said monitoring capabilities including one or more of:
a current set of data resources being monitored by each of said plurality of monitoring entities;
a set of data resources which each of said plurality of monitoring entities is capable of monitoring;
monitoring metrics which each of said plurality of monitoring entities is currently monitoring;
monitoring metrics which each of said plurality of monitoring entities is capable of currently monitoring;
a current monitoring period; and data format capabilities of each of said plurality of monitoring entities; and in response to identifying at least one monitoring entity of said plurality of monitoring entities including monitoring capabilities matching the monitoring requirements of the new consumer, selecting at least one of the identified monitoring entities and binding the new consumer to the selected at least one of the identified monitoring entities, wherein binding said new consumer to said selected at least one of the identified monitoring entities comprises establishing a connection between said new consumer and said selected at least one of the identified monitoring entities, sending a description of the new consumer's monitoring requirements to said selected at least one of the identified monitoring entities, and configuring said selected at least one of the monitoring entities to perform said new consumer's monitoring requirements; and in response to a failure to identify at least one of the monitoring entities having monitoring capabilities matching all monitoring requirements of the new consumer, initiating a negotiation between the new consumer and a plurality of monitoring entities to select a best match, relative to other matches based on quality of service parameters, between the monitoring requirements of the new consumer and the monitoring capabilities of the plurality of monitoring entities.

* * * * *